Sept. 24, 1968    W. C. PRIOR    3,402,616

MANUFACTURE OF VARIABLE SPEED BELTS

Filed Dec. 2, 1965

INVENTOR.
WILLIAM C. PRIOR
BY Watts & Fisher, attys.

United States Patent Office 3,402,616
Patented Sept. 24, 1968

3,402,616
MANUFACTURE OF VARIABLE SPEED BELTS
William C. Prior, Chagrin Falls, Ohio, assignor to
Speed Selector, Inc.
Filed Dec. 2, 1965, Ser. No. 511,073
17 Claims. (Cl. 74—233)

ABSTRACT OF THE DISCLOSURE

A drive belt and method of construction including a plurality of rigid, transversely extending stiffening elements spaced throughout the extent of the belt, a flexible web formed of a molded elastomer extending between and connecting the elements together, and a non-extensible, load-carrying belt portion overlying the web and preferably exposed on the outer surface of the belt.

---

This invention relates generally to drive belts, and more specifically to the construction of variable speed belts of the type adapted for use in conjunction with variable pulleys and the like.

Conventional variable speed drive belts have been of two basic constructions. The first of these constructions evolved as a special variation of the standard industrial V-belt and has been usually produced with essentially the same machinery, materials and processes. The second basic construction of the prior art is characterized by an endless strand or web which carries a series of longitudinal spaced blocks of metal or wood. In the typical construction, the blocks have been connected to the strand by screws or pins.

The variable speed belt which has been constructed as a variation of the standard V-belt is essentially comprised of one or more endless cords of sufficient strength to sustain the belt pull and initial tension. Generally, the cords are embedded in a supporting pad of soft rubber. A more rigid layer of rubber is provided to form the inner or compression section of the belt, and the outer or tension face of the belt is typically composed of bias cut rubber-impregnated fabric. Often the entire belt has an outside covering of fabric which imparts specific friction characteristics.

The process of building standard V-belts is primarily determined by the use of rubber which must be compounded, milled, fabricated and vulcanized. Thus, the belts are produced in much the same manner as tires in that the various layers of rubber compounds, fabrics and cords are wound individually on a drum and the resulting tube is sliced into belts. After the belt edges have been trimmed to form a V-section, the typical procedure is to cover the belt with its outer case and to cure the whole assembly in a mold under a steam bag.

The foregoing process which has been utilized in the production of conventional variable speed belts is relatively complex and requires expensive tooling, and is limited to a product having wide dimensional tolerances and one that does not require a uniform composition. While the process and the quality of the product are within the requirements for standard V-belts, the V-belt construction approach does not provide a satisfactory solution to the problems attendant to the manufacture and use of variable speed belts.

The main distinction between a standard V-belt and a variable speed belt is that the latter are made considerably wider so that the faces of an adjustable pitch pulley can clear one another throughout the range of pitch diameter. Because of their width, dimensional inaccuracies inherent in the above-described process of manufacture are amplified and it is not unusual for the pitch diameter of the conventional variable speed drive belt to vary from place to place on the belt, as well as from side to side. In addition, the conventionally produced variable speed belts are susceptible to being out of balance because of variations in their mass density.

Another difficulty encountered with the conventionally formed, wide and thin variable speed belt is that the belt tends to sag between the pulley faces. The sag imposes a larger percentage of the belt pull on the side cords than on the center cords and adversely affects the performance and life of the belt. The relatively heavy and stiff material which has been used in the compression section of the variable speed belt in an attempt to provide greater transverse rigidity and overcome sagging has decreased the flexibility of the belt. Hence the variable speed belt of the prior art has been less resilient and does not run as smooth as the standard V-belt.

Other problems attendant to the manufacture and use of variable speed belts include the fact that the sides of such belts are usually formed on narrower or steeper angles than the sides of V-belts in order to obtain wider speed ranges with a given belt width. Since the variable drive belt rides on a steeper angle than V-belts, they are typically less efficient and run hotter in use.

The second basic construction of the prior art which involves a series of blocks mechanically connected to a strand or web also does not provide a satisfactory solution to the many and varied problems presented by variable speed belts. The most serious objection to its construction is the large size and high weight of the belts which limits the useable pitch line velocity to low values, and in turn makes the resulting transmissions bulky and slow.

The present invention contemplates a new and different approach to the construction of variable speed belts and provides a new belt which overcomes the problems discussed above. In particular, the invention provides a new variable speed drive belt which is characterized by its small size and light weight, flexibility, high strength, close dimensional tolerances, uniformity of pitch diameter and mass density and ease of construction. The new belt has the transverse strength required to prevent sagging and its construction is such that in use the imposed loads are transmitted uniformly throughout the belt. At the same time, the belt has the necessary flexibility which permits it to ride smoothly on the connected pulleys and to conform to any variations in the pulley faces. The new belt is also characterized by good abrasion and wear resistance and by a high coefficient of friction of its drive surfaces.

The new belt is a composite structure generally comprised of a plurality of rigid, transversely extending supporting and stiffening elements spaced throughout the extent of the belt, traction pad areas or drive surfaces at the sides of the belt, and flexible structure extending between and connecting the stiffening elements together. The flexible connecting structure includes a load-carrying portion designed to carry the tension loads imposed on the belt.

The supporting and stiffening elements are integrated into the belt structure so as to distribute the loads and stresses uniformly and to provide the desired transverse rigidity without impairing the flexibility of the belt. In the preferred embodiment, the flexible connecting structure includes a web portion in which the ends of the supporting elements are embedded to provide the traction pad areas. Thus, the ends of the elements serve accurately to locate the traction pad areas throughout the belt. The traction pad areas are preferably formed of a molded or cast elastomer having a high coefficient of friction, good wear and abrasion resistance, and sufficient flexibility to conform to any variations in the pulley faces.

The load-carrying portion of the belt is comprised of at least one non-extensible flexible member which extends over the stiffening elements longitudinally of the belt. In a preferred construction, the member forming the load-carrying portion is an endless band or strip located approximately on the pitch diameter or neutral axis of the belt. Since the band is located on the neutral axis and is not required either to stretch or compress to accommodate flexing of the belt, the non-extensible band can be formed to maintain a constant and accurate length of the belt during use.

The invention further contemplates methods of producing belts having the foregoing characteristics. In accordance with the preferred method of manufacture, the stiffening elements are arranged in spaced relationship and an elastomer is injection molder or cast to form the connecting web portion which extends between the elements. The ends of the stiffening elements are preferably embedded in the web during the injection molding or casting step in order to form the traction pad or drive surfaces. When the web portion has been injection molded or cast to connect the elements together, the endless member having the characteristics desired of the load-carrying portion is adhered or otherwise secured to the outer surface of the belt around the elements. As will become more apparent, the new method of molding or casting a variable drive belt is economical and eliminates the inaccuracies and other disadvantages attendant to conventional manufacturing processes.

Still other features and a more complete understanding of the invention will be had from the following detailed description when taken in conjunction with the accompanying drawing.

In the drawing:

FIGURE 2 is a cross-sectional view taken on the line 2—2 of FIG. 1a;

Figure 1:
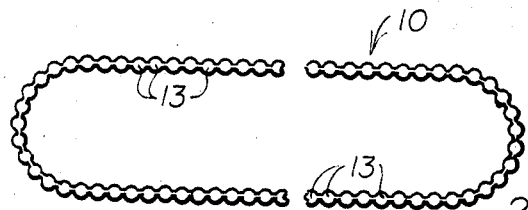
FIGURE 1 is a schematic side elevational view of a variable speed belt formed in accordance with this invention.
Figure 1A:
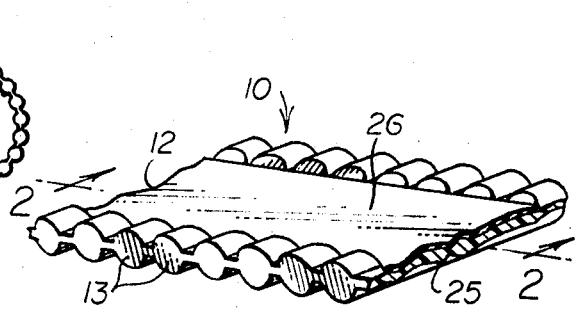
FIGURE 1a is a perspective view of a portion of the belt.

Referring now to the drawings, and to the embodiment of FIGS. 1 through 4 in particular, the illustrated fragmentary portion of the new variable speed drive belt is designated by reference numeral 10. As generally described above, the belt 10 is a composite structure comprising a plurality of transversely extending, supporting and stiffening elements 11 which are spaced throughout the extent of the belt and are connected together by a flexible structure 12. The side edges of the belt establish traction pad areas 13 which are engageable with the faces of the pulleys (not shown) when the belt is in use.

The supporting and stiffening elements 11 prevent the belt 10 from sagging laterally when in use and serve to distribute uniformly the loads and stresses imposed on the belt. In a typical construction, the elements 11 may be spaced apart a distance which is on the order of one quarter inch. The elements 11 are made of a suitably rigid material which will impart transverse rigidity to the belt. Preferably, the elements are injection molded of a rigid plastic, such as polycarbonate resin, nylon, acetal resin, polystyrene, acrylonitrile-butadiene-styrene resins or the like. The elements 11 also can be formed by a rigid plastic filled with fiberglass or by steel stampings or the like.

As shown, each of the supporting and stiffening elements 11 comprises an upper surface portion 18, a lower surface portion 19 and end portions 20. The upper surface portions 18 are preferably flat. The end portions 20, which locate the traction pad areas 13, are enlarged relative to the thickness of the elements between the upper and lower surface portions.

Figure 3:
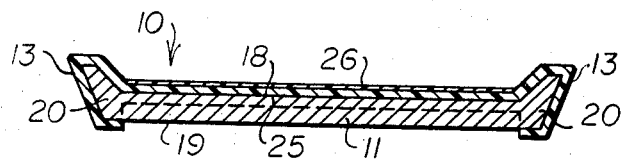
FIGURE 3 is a cross-sectional view taken on the line 3—3 of FIG. 2.
Figure 4:
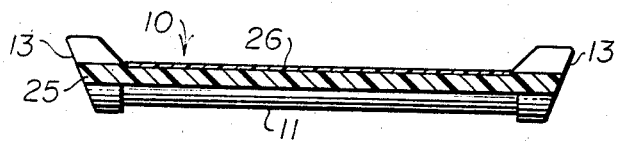
FIGURE 4 is a cross-sectional view taken on the line 4—4 of FIG. 2.

The flexible connecting structures 12 consists of a web portion 25 and a load-carrying portion 26. According to the preferred embodiment of the invention, the web portion 25 and the load-carrying portion 26 are separately formed members. The web portion 25 extends between and interconnects the spaced elements 11 and at least part of each element 11 is embedded in the web portion. Referring particularly to FIG. 3, it will be seen that in the preferred construction the web portion 25 extends over the flat surfaces 18 of the elements 11 and over the end portions 20 of each element to form the traction pad areas or drive surfaces 13. The end portions 20 and the traction pad areas or drive surfaces 13 formed by the web are inclined inwardly from the upper surface portions 18 of the elements 11 toward the lower surface portions 19. The angle on which the traction pad areas 13 are formed is relatively narrow compared to the sides of a standard V-belt in order to obtain a wide speed range with a given belt width.

The web portion 25 is formed of a flexible material which has a high coefficient of friction and good wear and abrasion resistant properties. Preferably, the web portion is a molded elastomer, such as polyurethane or the like.

The tension loads imposed on the belt 10 in use are sustained by the load-carrying portion 26. This portion of the belt is comprised of a least one endless, non-extensible member which extends over the upper surface portions 18 of the elements 11 between their ends 20. In the illustrated embodiment, the load-carrying portion 26 consists of a single strip or band formed of a flexible plastic having a high tensile strength. A suitable material for the strip or band is an oriented Mylar film which may be approximately .015 inch in thickness and an inch or more in width. The preferred Mylar film has a tensile strength up to 40,000 p.s.i. and affords excellent flexibility to the belt 10. Alternatively, the load-carrying portion 26 can be formed of metal or by one or more endless cords of nylon, a suitable polyester, glass fiber or the like.

Figure 2:
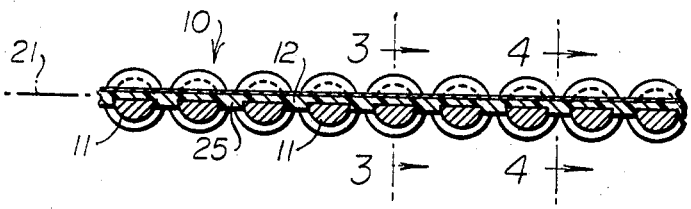

In accordance with this invention, the load-carrying portion 26 of the belt 10 is located approximately on the pitch diameter or neutral axis 21 of the belt (FIG. 2). The neutral axis 21 lies between the inner and outer sections, and the material extending along this axis is not required to stretch or compress to accommodate bending of the belt. Since the member 26 substantially coincides with the neutral axis 21 and is not required to stretch or compress, it can be formed of a non-extensible material which will carry the full tension loads and will not relax under the tractive force. Thus, the location and construction of the load-carrying portion 26 provides a belt having an accurate, unvarying length.

Figure 5:
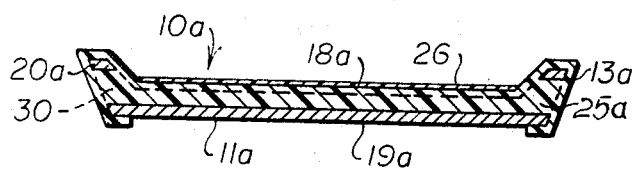
FIGURE 5 is a cross-sectional view, similar to FIG. 4, of a modified belt construction.

The embodiment of FIGURE 5 is similar to that described above in conjunction with FIGS. 1 through 4 except that the end portions 20a of the elements 11a are provided with holes 30. The elements 11a may be confeniently formed by providing tubes of rigid plastic or other material and cutting away the upper sections of the tubes between their end portions. In the embodiment shown in FIG. 5, the material forming the web portion 25a extends into the holes 30 to form a secure lock with the elements.

According to the preferred method of manufacture, the elements 11 are arranged in spaced parallel relationship and an elastomer as described above is injection molded or cast to form the web portion 25 that extends between and connects the elements together and forms the drive surfaces 13. After the molding operation, the load-carrying strip 26 is assembled around the circumference of the belt over the surface portions 18 of the elements 11 and is secured in place. In the illustrated embodiment of the invention in which the load-carrying portion 26 is a strip of Mylar film, the ends of the strip are ultrasonically welded together to form an endless band and the band is secured to the rest of the belt structure with a suitable adhesive.

The injection molding or casting operation can be carried out in one operation to form a complete endless belt. However, in such an operation, it is difficult to obtain a uniform fill of the plastic material because of the length and intricacy of the mold. Moreover, the mold would be relatively expensive. Some belt manufacturers have over 50,000 belt molds in order to accommodate all of the various cross-sections and lengths in common use and to replace these with injection or casting molds would be costly.

In overcoming the foregoing problems, this invention contemplates a progressive molding operation in which the belt 10 is molded in sections. In the preferred molding operation, two or more of the elements 11 are placed in the mold and the elastomer forming the web portion 25 is formed around the elements in the manner shown. In carrying out this operation, the material of the web portion 25 is molded so that it extends from the center line of one element 11 to the center line of the adjacent element, thereby locking the elements together. When the molding cycle is completed, additional elements 11 are placed in the mold and the molding operation is repeated. Each molded section may be connected to the previous molded section as part of the molding cycle or by a mechanical interlock or a weld. The separate molding operations are repeated until the proper belt length has been made then the free end of the belt is placed in the mold and the final element is molded between the ends of the belt to connect them together. It will be apparent that the progressive molding operation may be carried out on a machine wherein one half of the mold is a wheel which is indexed forward during each cycle or on a continuous extrusion press.

Many modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:

1. A drive belt comprising in combination:
    (a) a plurality of rigid, transversely extending supporting and stiffening elements spaced throughout the extent of said belt,
    (b) exposed drive surfaces established by the side edges of said belt,
    (c) said belt having a neutral axis,
    (d) a flexible web consisting of an elastomer extending between and integrally connecting said elements together, and
    (e) a load-carrying, non-extensible portion overlying said web substantially coinciding with said neutral axis, and secured to said web;
    (f) said load-carrying portion being exposed on the outer surface of said belt.

2. The drive belt as claimed in claim 1 wherein said web and said load-carrying portion are separately formed members and wherein at least part of each element is embedded in said web to form an integral belt structure.

3. The drive belt as claimed in claim 1 wherein:
    (g) each of said elements includes:
        (i) an outer surface portion adjacent said load-carrying portion,
        (ii) an inner surface portion,
        (iii) end portions adjacent the side edges of said belt,
    (h) said end portions are embedded in the elastomer forming said web, and
    (i) said drive surfaces are formed by the material of said web in which the end portions of said elements are embedded.

4. The drive belt as claimed in claim 1 wherein:
    (g) each of said elements is an elongated member including:
        (i) an outer surface portion adjacent said load-carrying portion,
        (ii) an inner surface portion,
        (iii) end portions adjacent the side edges of said belt,
        (iv) said end portions being enlarged relative to the thickness of each element between said surface portions,
    (h) said web is formed of a plastic material,
    (i) said end portions of each element are embedded in said plastic material thereby to form said exposed drive surfaces,
    (j) said drive surfaces at the end of each element lie in planes converging from said outer surface portion toward said inner surface portion,
    (k) and said load-carrying portion comprises a nonextensible strip extending longitudinally of said belt and lying between said enlarged end portions of said elements.

5. The drive belt as claimed in claim 4 wherein said load-carrying portion is a plastic strip directly adhered to said web.

6. A method of producing a drive belt comprising:
    (a) providing a plurality of rigid supporting and stiffening elements,
    (b) connecting said elements together by a flexible web consisting of a molded elastomer,
    (c) said elements being connected together so that they are in spaced relationship throughout the extent of said belt and extend transversely thereof, and,
    (d) forming a nonextensible, load-carrying portion over said web,
    (e) said load-carrying portion being exposed on the outer surface of said belt.

7. The method as claimed in claim 6 wherein said web and said load-carrying portion are formed in separate steps, and wherein said load-carrying portion is formed by securing at least one non-extensible member over said elements so that said member extends longitudinally of said belt.

8. The method as claimed in claim 6 wherein said step of connecting said elements together includes embedding at least part of each element in said web.

9. The method as claimed in claim 8 wherein the ends of each element are embedded in said web to form drive surfaces.

10. The method as claimed in claim 9 including providing holes in the ends of said elements prior to embedding the ends in said web.

11. The method as claimed in claim 6 wherein the step of connecting said elements together includes molding a flexible plastic to form said web portion, said plastic being molded over the ends of said elements to form said drive surfaces; and wherein said load-carry portion is formed by securing at least one non-extensible member over said elements and said web.

12. A drive belt comprising in combination:
    (a) a plurality of rigid, transversely extending supporting and stiffening elements spaced throughout the extent of said belt,
    (b) each of said elements including:
        (i) an outer surface portion,
        (ii) an inner surface portion,
        (iii) end portions adjacent the side edges of said belt,
        (iv) said end portions being formed with holes lying on the axes of said elements, (c) exposed drive surfaces established by the side edges of said belt,
(d) said drive surfaces being formed of a wear and abrasion resistant material,
(e) said belt having a neutral axis, and
(f) flexible structure extending between and integrally connecting said elements together,
(g) said structure including:
  (i) a web portion in which said end portions of said elements are embedded, the material of said web portion extending into said holes in said end portions of said elements,
  (ii) said drive surfaces being formed by the material of said web portion in which said end portions of said elements are embedded,
  (iii) and a load-carrying portion substantially coinciding with said neutral axis, said load-carrying portion being adjacent said outer surface portion of said element and secured to said web portion.

13. A drive belt comprising:
(a) a plurality of rigid, transversely extending supporting and stiffening elements spaced throughout the extent of said belt,
(b) a flexible web formed of a plastic material extending between and connecting said elements together, and
(c) a non-extensible, flexible load-carrying member overlying said web,
(d) said member being exposed on the outer surface of said belt and secured to said web.

14. A drive belt as claimed in claim 13 wherein said load-carrying member comprises a plastic strip.

15. A method of forming a drive belt comprising the steps of:
(a) placing a plurality of rigid stiffening elements in parallel spaced relationship,
(b) injection molding a plastic material to form a flexible web extending between and connecting said elements together, and
(c) forming a flexible load-carrying, non-extensible belt portion over said web.

16. A method as claimed in claim 15 wherein said load-carrying belt portion is formed by securing at least one non-extensible member to said web, said member being exposed on the outer surface of said belt.

17. A method as claimed in claim 15 wherein said load-carrying belt portion is formed by securing a plastic strip to said web.

References Cited

UNITED STATES PATENTS

| | | | |
|---|---|---|---|
| 1,982,869 | 12/1934 | Heyer | 74—233 |
| 2,189,049 | 2/1940 | Ungar | 74—233 |

FRED C. MATTERN, *Primary Examiner.*

J. A. WONG, *Assistant Examiner.*